(12) United States Patent
Iwamatsu et al.

(10) Patent No.: US 7,167,456 B2
(45) Date of Patent: Jan. 23, 2007

(54) APPARATUS FOR ESTIMATING PROPAGATION PATH CHARACTERISTICS

(75) Inventors: Takanori Iwamatsu, Kawasaki (JP); Yasuharu Amezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 993 days.

(21) Appl. No.: 10/121,776

(22) Filed: Apr. 12, 2002

(65) Prior Publication Data
US 2003/0081562 A1 May 1, 2003

(30) Foreign Application Priority Data
Oct. 31, 2001 (JP) ............................. 2001-334040

(51) Int. Cl.
*H04B 7/212* (2006.01)
(52) U.S. Cl. ...................... 370/321; 375/150
(58) Field of Classification Search ............... 370/320, 370/321, 332, 252, 335, 337, 342, 347, 441, 370/442, 479, 487, 203, 208, 209, 210, 345; 375/148, 150, 324, 342, 343, 344, 346–349, 375/147, 130, 140, 142
See application file for complete search history.

(56) References Cited

U.S. PATENT DOCUMENTS

| | | | | |
|---|---|---|---|---|
| 5,448,600 A * | 9/1995 | Lucas | ........................ | 370/342 |
| 6,414,988 B1 * | 7/2002 | Ling | ........................ | 375/150 |
| 6,442,218 B1 | 8/2002 | Nakamura et al. | | |
| 6,674,740 B1 * | 1/2004 | Siala | ........................ | 370/342 |
| 6,683,907 B2 * | 1/2004 | Ling | ........................ | 375/147 |
| 6,700,929 B1 * | 3/2004 | Shan et al. | ................. | 375/224 |
| 6,801,586 B1 * | 10/2004 | Imamura | ................... | 375/340 |
| 6,876,694 B2 | 4/2005 | Komatsu | | |
| 6,990,158 B2 * | 1/2006 | Shan et al. | ................. | 375/346 |

FOREIGN PATENT DOCUMENTS

| | | |
|---|---|---|
| JP | 11-355849 | 12/1999 |
| JP | 2000-41010 | 2/2000 |
| JP | 2000-082978 | 3/2000 |
| JP | 2001-053644 | 2/2001 |
| JP | 2001-267960 | 9/2001 |
| JP | 2001-339325 | 12/2001 |

OTHER PUBLICATIONS

Japanese Patent Office Notice of Rejection dated Mar. 28, 2006 with translation.

* cited by examiner

*Primary Examiner*—Brenda Pham
(74) *Attorney, Agent, or Firm*—Katten Muchin Rosenman LLP

(57) ABSTRACT

An apparatus for estimating phase/amplitude characteristics of a propagation path. The apparatus removes, from a receive signal on a data channel on which known information is transmitted upon being time-multiplexed between items of unknown information, transmit information on this channel, which provides phase/amplitude information indicative of phase/amplitude characteristics that this data channel has suffered over the propagation path. The apparatus further removes from a receive signal on a data channel on which only unknown information is transmitted, transmit information on this channel, which provides phase/amplitude information indicative of phase/amplitude characteristics that this data channel has suffered over the propagation path. The apparatus includes an adder for adding the two phase/amplitude information and an estimation unit for estimating, from an adder output, a phase characteristic and an amplitude characteristic that each channel has suffered over the propagation path.

10 Claims, 9 Drawing Sheets

APPARATUS FOR ESTIMATING PROPAGATION PATH CHARACTERISTICS

BACKGROUND OF THE INVENTION

This invention relates to an apparatus for estimating propagation path characteristics. More particularly, the invention relates to the above apparatus used in a communication system in which information is transmitted upon being code-multiplexed onto a data channel on which known information is transmitted upon being time-multiplexed between items of unknown information and a data channel on which only unknown information is transmitted, the apparatus being suitable for a case where phase/amplitude characteristics which the plurality of data channels have suffered on the propagation path are estimated.

The amplitude and the phase of received signal are changed by the influence of reflection, diffraction, and scatter in mobile communications. If data symbols are received and demodulated under these conditions, known symbols (e.g., pilot symbols) transmitted together with the data symbols are received and demodulated, the phase/amplitude characteristics of the propagation path are estimated from the pilot symbols and the data symbols are processed to synchronous detection upon eliminating the effects of the propagation path.

FIG. 12 is a block diagram of a CDMA receiver. A radio unit 1 converts a high-frequency signal received by an antenna TN to an inter-frequency (IF) signal by applying a frequency conversion (RF→IF conversion). A quasi-syschronously detector 2 converts the IF signal to the baseband signal and outputs in-phase data and quadrature-phase data. The quasi-synchronouly detector 2 includes a oscillator 2a, a phase shifter 2b for shifting the phase of the receive carrier by π/2, and multipliers 2c, 2d for multiplying the baseband signal by the output of oscillator and outputting the in-phase signal and the quadrature-phase signal. Low-pass filters (LPF) 3a, 3b limit the bands of these output signals and AD converters 5a, 5b convert the in-phase and quadrature-phase signals to digital signals and input the digital signals to a searcher 6 and to each of fingers $7a_1$ to $7a_4$.

When a direct-sequence signal (DS signal) that has been influenced by multipath is input to the searcher 6, the latter performs an autocorrelation operation using a matched filter (not shown) to detect multipath and inputs despread-start timing data and delay-time adjustment data of the paths to respective ones of the fingers $7a_1$ to $7a_4$. A despreader/delay-time adjustment unit 4a in each of the fingers $7a_1$ to $7a_4$ performs dispreading using a code identical with the spreading code, performs dump integration, then applies delay processing conforming to the path and outputs a pilot signal and an information signal. A channel estimation unit (phase compensator) 4b averages each of the in-phase and quadrature-phase components of the pilot signal over a prescribed number of slots and outputs channel estimation signals It, Qt. A synchronous detector 4c restores the phases of the despread information signals I', Q' based upon a phase difference θ between the pilot signal contained in the receive signal and a known pilot signal, and a RAKE combiner combines the outputs of the fingers.

More specifically, let Pn represent a pilot symbol, and let ξn represent a propagation path characteristic. The despreader/delay-time adjustment unit 4a outputs a pilot symbol Pn·ξn, which has been influenced by the propagation path, by despread processing, and the channel estimation unit 4b multiplies this pilot by the complex conjugate Pn* of a known pilot symbol and estimates the propagation path characteristic ξn. That is, the channel estimation unit 4b performs the operation $$\xi n\hat{} = Pn \cdot \xi n \cdot Pn^* = \xi n \cdot |Pn|^2 \quad (1)$$

and estimates the propagation path characteristic ξn. In actuality, the receive symbol is influenced by noise and interference. By taking the average of the propagation path characteristic ξn^ found by Equation (1), e.g., by calculating the moving average over a plurality of pilot symbols, therefore, precision is improved.

A first available scheme for transmitting known symbols (pilots) is a scheme having, in addition to a data channel, a separate channel that transmits only known symbols. For example, see Okawa, Ando, Sawahashi, Adachi, "2-Mbps Multicode Transmission Characteristics in DS-CDMA", Electronic Information Communications Society Convention, B-345, pp. 346, 1996. According to this reference, channel estimation is performed by Equation (1) using the correlation values of pilot bits (pilot symbols) transmitted successively in time, and a method such as moving average processing is used to precisely estimate phase information and amplitude information that the data channel has received over the propagation path. FIG. 13 is a block diagram of a channel estimation circuit according to such prior art. Here a pilot symbol correlator 8a multiplies a baseband signal by a despreading code identical with the pilot spreading code on the transmitting side and outputs a pilot symbol Pn·ξn, which has been influenced by the propagation path. A multiplier 8b multiplies the output of the correlator by the complex conjugate Pn* of the known pilot symbol and estimates the propagation path characteristic ξn. A moving average processing unit 8c calculates the moving average and outputs the propagation path characteristic (estimated value of phase/amplitude).

A second available scheme for transmitting a known symbol is one in which an unknown information symbol is inserted at some positions of pilot bits (pilot symbols) that should have been transmitted successively. For example, with an uplink frame structure in the FDD mode standardized by the 3$^{rd}$ Generation Partnership Project (referred to as "3GPP" below), as shown in FIG. 14, a DPDCH data channel (Dedicated Physical Data Channel), on which only unknown information is transmitted, and a DPCCH control channel (Dedicated Physical Control Channel), on which pilot bits are transmitted upon being time-multiplexed periodically between items of unknown information, are multiplexed on real part and imaginary part by orthogonal codes.

More specifically, in the frame format of an uplink signal from a mobile station to a base station, one frame has a duration of 10 ms and is composed of 15 slots $S_0$ to $S_{14}$. The DPDCH data channel is mapped to the orthogonal in-phase of QPSK modulation and the DPCCH control channel is mapped to the orthogonal quadrature-phase of QPSK modulation. Each slot of the DPDCH data channel is composed of n bits, and n varies in dependence upon symbol speed. Data of one or more transport channels can be transmitted upon being multiplexed up to a maximum of six channels on the DPDCH data channel. For example, voice code data obtained by compression coding in accordance with CELP is divided into a voice code portion having a high degree of importance and a voice code portion having a low degree of importance, and the data is multiplexed and transmitted on difference transport channels upon assigning a predetermined number of bits per frame to each voice code portion.

Each slot of the DPCCH control channel that transmits the control data is composed of ten bits. The symbol speed is 15 ksps. Each slot of this channel transmits a pilot PILOT, transmission-power control data TPC, a transport format combination indicator TFCI and feedback information FBI. The numbers of bits constituting PILOT, TPC, TFCI and FBI can be changed as necessary. As mentioned above, PILOT is utilized when performing channel estimation (estimation of propagation path characteristics) and SIR measurement on the receiving side, TPC is utilized in control of transmission power, TFCI transmits the symbol speed of the data, the number of bits per frame and the number of bits increased by repetition, and FBI controls transmission diversity at the base station.

In the 3GPP frame format structure, a known information component can be eliminated in a known-information interval and the propagation path characteristics can be estimated correctly if the propagation path is estimated according to the first scheme mentioned above. In an unknown-information interval, however, a problem that arises is that the unknown information component cannot be eliminated, the propagation path characteristics cannot be estimated accurately and the phase information and amplitude information obtained has a large error. For example, assume that a receive signal r is as follows:

$$r = d \cdot \exp(\Phi) + n \quad (2)$$

where d represents the information component of the pilot bit, $\Phi$ the phase component of the transmission path (for the sake of simplicity, it is assumed here that the amplitude component is fixed), and n the noise component. With the phase-component estimation method of the first scheme, we have $$x = \Sigma d \cdot r = \Sigma d \cdot [d \cdot \exp(\Phi) + n] \quad (3)$$

If n is noise whose mean value is zero and d is one, then we have $$x = \exp(\Phi) \quad (4)$$

and the phase component of the transmission path can be estimated. However, if d is an unknown data bit in an unknown-information interval and takes on values of both 1 and −1, $x = \exp(\Phi)$ will not hold and the obtained estimated value of the phase component will have a large error.

Accordingly, with the 3GPP frame format structure, the propagation path characteristics are estimated in the known-information interval (PILOT interval) using the first scheme, and the propagation path characteristics are estimated by linear interpolation in the unknown-information interval (TFCI, FBI, TPC) using propagation path characteristic data of the known-information interval. FIG. 15 is a block diagram of such a channel estimation circuit. Here a DPCCH correlator 9a multiplies a baseband signal by a despreading code identical with the DPCCH spreading code on the transmitting side and outputs a symbol of the control channel which has been influenced by the propagation path. A multiplier 9b multiplies the output of the correlator by the complex conjugate Pn* of the known pilot symbol and estimates the propagation path characteristics in the known-information interval. An adder 9c adds and averages the output of the multiplier over the number of known symbols within one slot, and a linear interpolating processor 9d estimates the propagation path characteristics in the unknown symbol interval by executing linear interpolation processing.

However, though the propagation path characteristics can be estimated correctly in the known-information interval if the propagation path is estimated by the arrangement of FIG. 15, the propagation path characteristics cannot be estimated accurately in the unknown-information interval because use is made of the propagation path characteristics that were estimated in the known-information interval. The problem that results is that the phase information and amplitude information obtained exhibits a large error.

SUMMARY OF THE INVENTION

An object of the present invention is to so arrange it that the precision with which propagation path characteristics are estimated can be improved even in an unknown-information interval.

According to the present invention, the foregoing object is attained by providing an apparatus for estimating propagation path characteristics, comprising a first transmit information removal unit for removing, from a receive signal on a data channel on which known information is transmitted upon being time-multiplexed between items of unknown information, transmit information on this channel; a second transmit information removal unit for removing, from a receive signal on a data channel on which only unknown information is transmitted, transmit information on this channel; an adder for adding outputs from the first and second transmit information removal units; and a phase/amplitude estimation unit for estimating, from an output of the adder, a phase characteristic and an amplitude characteristic that each channel has suffered over a propagation path.

In accordance with the present invention, phase/amplitude information, which represents phase/amplitude characteristics suffered over a propagation path, is generated artificially upon removing transmit information from a receive signal on a data channel on which known information is transmitted upon being time-multiplexed between items of unknown information; phase/amplitude information, which represents phase/amplitude characteristics suffered over a propagation path, is similarly generated artificially upon removing transmit information from a receive signal on a data channel on which only unknown information is transmitted; and the phase/amplitude information on these data channels is added, thereby improving the precision with which the phase/amplitude characteristics of the propagation path are estimated.

Further, an information decision unit in the apparatus of the present invention performs complex multiplication between a complex-represented receive signal and a complex conjugate of the phase/amplitude information, and outputs the obtained results of the complex multiplication as decision information. If this arrangement is adopted, likelihood information can be appended to the output signal of the information decision unit. Even if power diminishes owing to fading, therefore, it is possible to mitigate the effects upon the operation for estimating the phase/amplitude characteristics performed the phase/amplitude estimation unit.

Further, according to the present invention, it is so arranged that complex information that is output from information decision units on each of the paths of multiple paths is added. As a result, a diversity effect is obtained and it is possible to greatly improve the precision with which a sign decision unit decides the sign bits of an information component.

Further, according to the present invention, if the power of a data symbol input to the phase/amplitude estimation unit is low, then a value found by rotating the phase of a data symbol, which was output one sample earlier, by an amount equivalent to an average variation in phase is input to a moving average processing circuit or to a FIR filter, etc. As a result, it is possible to obtain a highly precise estimated value of phase/amplitude characteristics even in cases where the power of a data symbol is low.

Other features and advantages of the present invention will be apparent from the following description taken in conjunction with the accompanying drawings.

DESCRIPTION OF THE PREFERRED EMBODIMENTS

Figure 14:
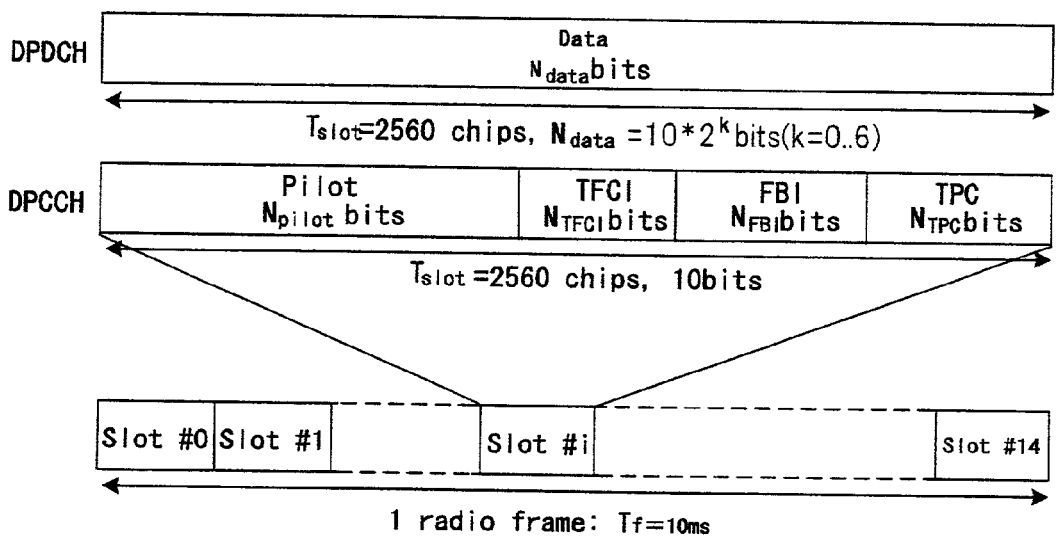
FIG. 14 is a diagram showing the structure of a 3GPP uplink frame according to the prior art.
Figure 15:
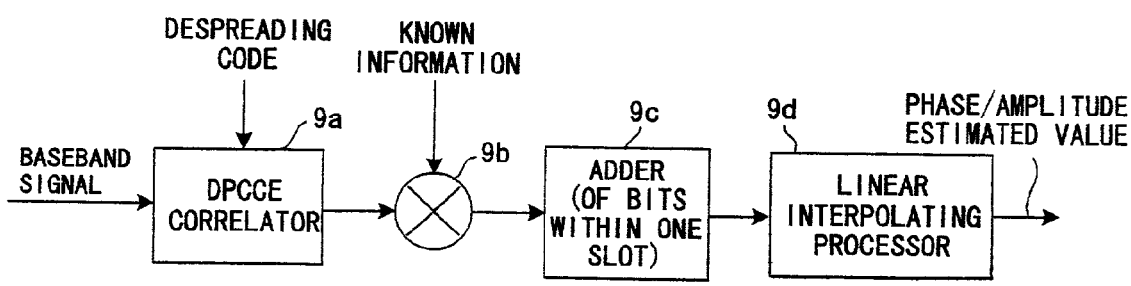
FIG. 15 is a block diagram of an apparatus for estimating phase/amplitude characteristics in a case where use is made of the 3GPP frame format.

An embodiment of the present invention will now be described for a case where, in accordance with the 3GPP uplink frame format shown in FIG. 14, the DPDCH data channel on which only unknown information is transmitted is mapped to a real part, the DPCCH control channel on which pilot bits constituting known information is transmitted upon being time-multiplexed periodically between items of unknown information is mapped to an imaginary part, and the channels are multiplexed using orthogonal codes.

(A) Structure of Circuit for Estimating Propagation Path Characteristics

Figure 1:
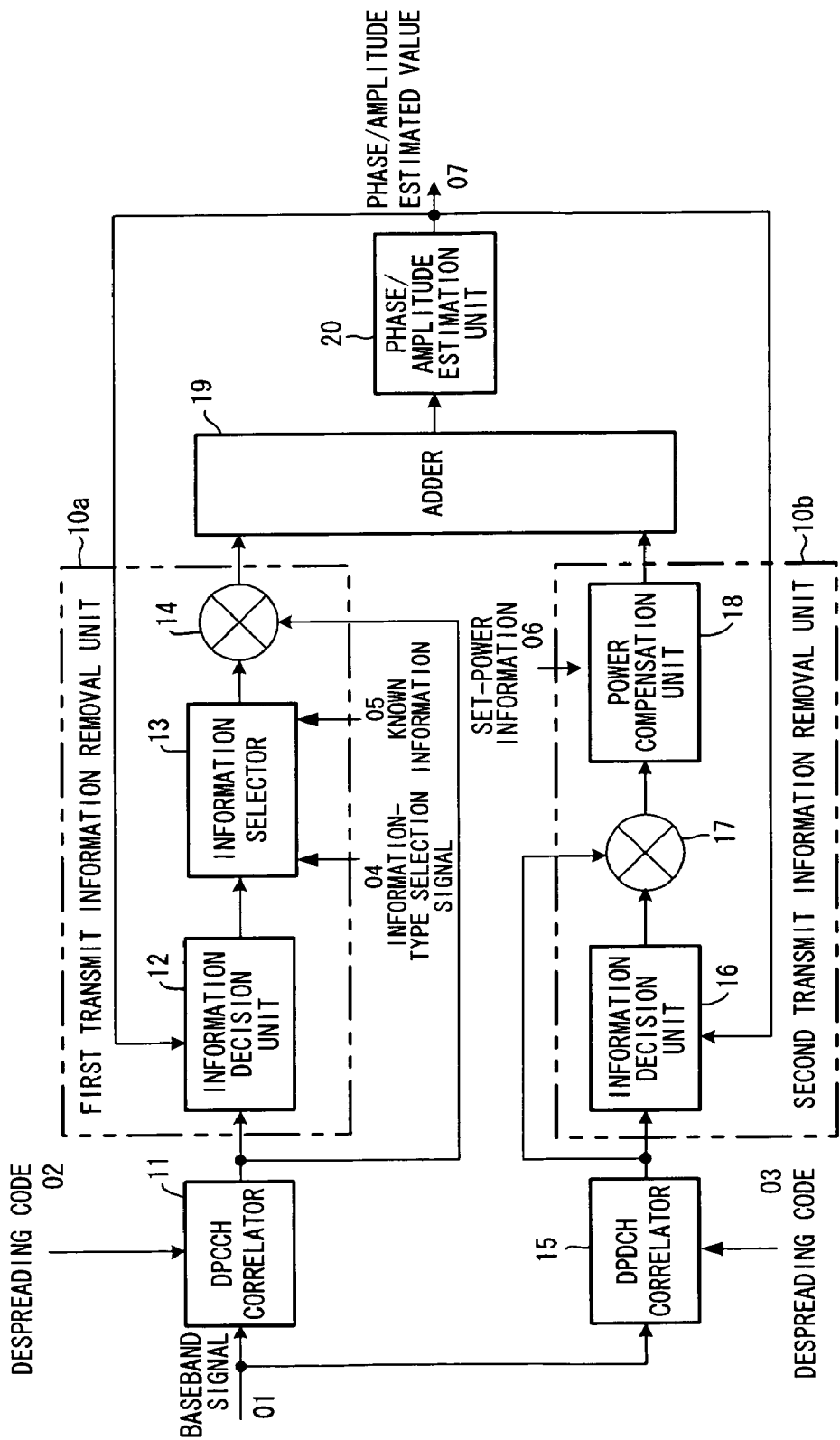
FIG. 1 is a block diagram illustrating an embodiment of an apparatus for estimating propagation path characteristics according to the present invention.

FIG. 1 is a block diagram illustrating an embodiment of an apparatus for estimating propagation path characteristics according to the present invention, in which phase/amplitude characteristics of a propagation path in a CDMA receiver are estimated. The apparatus includes a correlator 11, and information decision unit 12, an information selector 13 and a multiplier 14 provided for a DPCCH control channel, a correlator 15, an information decision unit 16, a multiplier 17 and a power compensation unit 18 provided for a DPDCH data channel, an adder 19 and a phase/amplitude estimation unit 20. The information decision unit 12, information selector 13 and multiplier 14 may be referred to as constituting a first transmit information removal unit 10a, and the information decision unit 16, multiplier 17 and power compensation unit 18 may be referred to as constituting a second transmit information removal unit 10b.

A signal that has been received by an antenna (not shown) is quasi-synchronously detected, the signal is then converted to an analog baseband signal, this signal is converted to a digital baseband signal by an A/D converter (not shown) and the baseband signal is input to a signal input terminal 01. A spreading code used when the DPCCH control channel is spread on the transmitting side is input as a DPCCH despreading code to an input terminal 02 of the DPCCH correlator 11 at a timing specified by a synchronization acquisition unit (not shown). Similarly, a spreading code used when the DPDCH control channel is spread on the transmitting side is input as a DPDCH despreading code to an input terminal 03 of the DPDCH correlator 15 at a timing specified by a synchronization acquisition unit (not shown).

An information-type selection signal, which indicates whether a bit currently undergoing processing is a pilot bit constituting known information, is input to an input terminal 04 of the information selector 13. That is, the information-type selection signal that enters the input terminal 04 indicates whether the bit currently being processed is a pilot bit, which is known information, in accordance with the phase of each despreading code that enters the input terminals 02, 03 and the frame format shown in FIG. 14. Known pilot-bit information, which has been generated by a known-information generator (not shown), is input to an input terminal 05. The reciprocal of the ratio of transmission power on the DPDCH data channel to the transmission power of the DPCCH control channel is input as set-power information to an input terminal 06.

The DPCCH correlator 11 performs a despreading operation using the baseband signal that enters from the input terminal 01 and the DPCCH despreading code that enters from the input terminal 02, and outputs data bits of the DPCCH control channel, i.e., DPCCH data bits [which correspond to Pn·ξn in Equation (1)] that have been influenced by the propagation path characteristics. Here Pn is the information component of the DPCCH control channel.

Using the DPCCH data bit output by the DPCCH correlator 11 and the estimated value of propagation path characteristic (estimated value of phase/amplitude) output by the phase/amplitude estimation unit 20, the information decision unit 12 decides the information component (sign bit) of the data bits (which correspond to Pn) on the DPCCH control channel and outputs the results of the decision.

The results of the decision output by the information decision unit 12 and the known information (pilot) enter the information selector 13 which, on the basis of the information-type selection signal, selectively outputs the results of the decision or the known information. More specifically, the information selector 13 selects the known information in a known-information interval and selects the results of the decision from the information decision unit 12 in intervals other than known-information intervals. The reason for selecting the known information that enters from the input terminal 05 is that this known information is more accurate than known information obtained by the decision performed by the information decision unit 12.

The multiplier 14 multiplies the data bits (Pn·ξn) of the DPCCH control channel, which has been influenced by the propagation path characteristics, output by the DPCCH correlator 11 by the information component (Pn) output from the information selector 13, removes the information component from the data bits of the DPCCH control channel and outputs data bits representing the propagation path characteristics (ξn).

The DPDCH correlator 15 performs a despread operation using the baseband signal that enters from the input terminal 01 and the DPDCH despreading code that enters from the input terminal 03, and outputs DPDCH data bits, i.e., DPDCH data bits (Dn·ξn) that have been influenced by the propagation path characteristics. Here Dn is the information component of the DPDCH data channel.

Using the data bit of the DPDCH data channel output by the DPDCH correlator 15 and the estimated value of phase/amplitude output by the phase/amplitude estimation unit 20, the information decision unit 16 decides the sign bit of the data bits (which correspond to Dn) on the DPDCH data channel and outputs the results of the decision.

The multiplier 17 multiplies the DPDCH data bits (Dn·ξn) of the DPDCH data channel, which has been influenced by the propagation path characteristics, output by the DPDCH correlator 15 by the information component (Dn) output from the information decision unit 16, removes the information component from the data bits of the DPDCH data channel and outputs data bits representing the propagation path characteristics (ξn).

Using the set-power information that enters from the input terminal 06, the power compensation unit 18 executes normalization processing for matching the units of the power of the data bits output by the multiplier 17 and the units of the power of the data bits output by the multiplier 14.

The adder 19 adds and outputs the data bit sequences input thereto, namely a data bit sequence representing propagation path characteristics (ξn) of the DPCCH control channel and a data bit sequence representing propagation path characteristics (ξn) of the DPDCH data channel.

Figure 2:
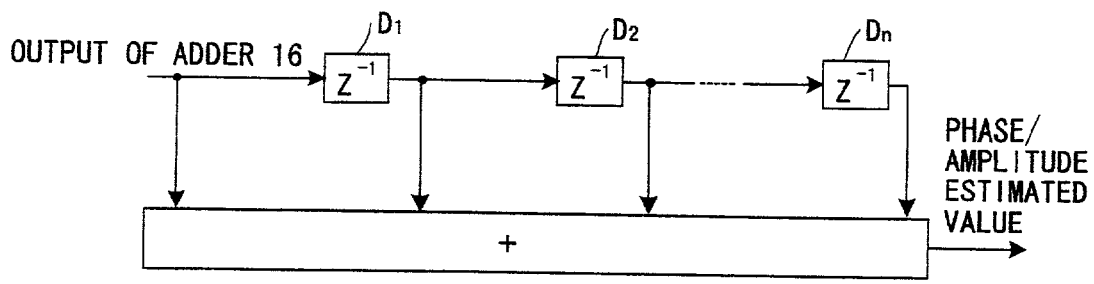
FIG. 2 is a diagram useful in describing a phase/amplitude estimation unit constituted by a moving average processing circuit.
Figure 3:
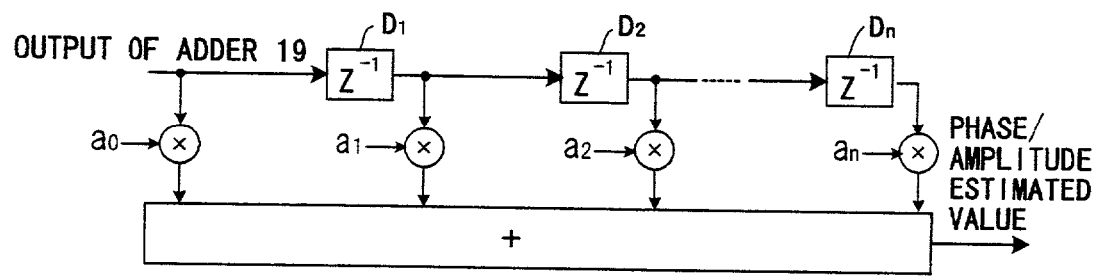
FIG. 3 is a diagram useful in describing a phase/amplitude estimation unit constituted by a FIR filter.

The data bit sequence output from the adder 19 enters the phase/amplitude estimation unit 20, which performs averaging or filtering processing using this data bit sequence and outputs an estimated value of phase/amplitude. The phase/amplitude estimation unit 20 can be constructed by a moving average processing circuit shown in FIG. 2 or an FIR filter shown in FIG. 3. The moving average processing circuit is constituted by delay units $D_1$ to $D_n$ of n taps, and an adder ADD for adding the outputs of these delay units. The FIR filter is constituted by delay units $D_1$ to $D_n$ of n taps, multipliers $M_1$ to $M_n$ for multiplying the outputs of these delay units by predetermined coefficients $a_1$ to $a_n$, respectively, and an adder ADD for adding the outputs of these multipliers.

(B) Operation

The DPCCH correlator 11 calculates the product sum of the baseband signal from the input terminal 01 and the DPCCH despreading code from the input terminal 02 over a predetermined interval (a single-bit spread length interval) and outputs the data bit sequence of the DPCCH data channel. In other words, the DPCCH correlator 11 performs a despreading operation and outputs the DPCCH control bit sequence (Pn·ξn), which has been influenced by the propagation path characteristics.

The information decision unit 12 decides the sign bits of the information component of the DPCCH data bit sequence, which is output from the DPCCH correlator 11, using as the reference phase the estimated value of phase/amplitude that enters from the phase/amplitude estimation unit 20. More specifically, the information decision unit 12 performs the following operation:

$$(DI+jDQ) \times (XI-jXQ) \quad (5)$$

where DI+jDQ represents the data bits of the DPCCH control channel and XI+jXQ represents the estimated value of phase/amplitude, and outputs the sign of the imaginary part of the operational results as the information component (Pn) of the data bit sequence of the DPCCH control channel. Here j is an imaginary number $(-1)^{1/2}$.

The information selector 13 refers to the information-type selection signal, outputs the known information, which enters from the input terminal 05, if the information component of the DPCCH data bit sequence that enters from the information decision unit 12 is a known information component, and outputs the information component of the DPCCH data bit sequence as is if the information component of the DPCCH data bit sequence that enters from the information decision unit 12 is not a known information component.

The multiplier 14 multiplies the information component (Pn) of the DPCCH data bits selected by the information selector 13 by the DPCCH data bits (Pn·ξn), which have been influenced by the propagation path characteristics, output by the DPCCH correlator 11, and outputs data bits (ξn) of the propagation path characteristics from which the information component (Pn) has been removed. In other words, the multiplier 14 performs the operation indicated by the following equation:

$$(DI+jDQ) \times (II-jIQ) \quad (6)$$

where II+jIQ represents the information component selected by the information selector 13. In 3GPP, the DPCCH information component is only jIQ.

Meanwhile, the DPDCH correlator 15 calculates the product sum of the baseband signal from the input terminal 01 and the DPDCH despreading code from the input terminal 03 over a predetermined interval (a single-bit spread length interval) and outputs the data bit sequence of the DPDCH data channel. In other words, the correlator 15 performs a despreading operation and outputs the DPDCH data bit sequence (Dn·ξn), which has been influenced by the propagation path characteristics.

The information decision unit 16 decides the sign bits of the information component of the DPDCH data bit sequence, which is obtained by the correlator 15, using as the reference phase the estimated value of phase/amplitude that enters from the phase/amplitude estimation unit 20. More specifically, the information decision unit 16 performs an operation that same as that indicated by Equation (5) and decides the sign bits of the information component (Dn) of the data bit sequence on the DPDCH data channel.

The multiplier 17 multiplies the DPDCH data bits (Dn·ξn) output by the DPDCH correlator 15 by the information component (Dn) of the DPDCH data bit sequence decided by the information decision unit 16 and outputs the data bits (ξn) of the propagation path characteristics from which the information component has been removed. More specifically, the multiplier 17 performs an operation that same as that indicated by Equation (6).

On the basis of the set-power information, the power compensation unit 18 normalizes the power value of the DPDCH data bit sequence, which is output from the multiplier 17, to the power value of the DPCCH data bit sequence output from the multiplier 14, and outputs the latter power value.

The adder 19 adds and outputs the phase/amplitude characteristics data that the DPCCH data bits output from the multiplier 14 acquire over the propagation path, and the phase/amplitude characteristics data that the DPDCH data bits acquire over the propagation path. If the bit rate of the DPDCH data channel and the bit rate of the DPCCH control channel differ in the above addition operation, it is required that the addition be performed upon effecting normalization to the bit rate of the DPDCH data channel.

The phase/amplitude estimation unit 20 passes the data bit sequence obtained by the addition at adder 19 through a FIR filter, whereby propagation path characteristics from which noise and interference components have been removed, namely estimated values of phase/amplitude characteristics, are output.

It is required that the tap coefficients of the FIR filter be selected so as to eliminate frequency components greater than a frequency allowed by the system to which the present invention is applied. More specifically, if a mobile station is moving at a velocity v, a maximum Doppler frequency shift of fd (=v/$\lambda$, where $\lambda$ represents the wavelength of carrier frequency fc) is sustained in accordance with the angle at which the waves arrive. In actuality, the carrier frequency between a mobile station and a receiver contains an error (frequency offset) $\Delta f$, and therefore the power of the baseband signal following quasi-synchronous detection at the receiver exhibits a frequency distribution of the kind shown at A in FIG. 4. Accordingly, based upon the velocity v of the mobile station allowed by the system and the carrier frequency error $\Delta f$ between the mobile station and the receiver allowed by the system, the tap coefficients of the FIR filter are chosen so as to have a frequency characteristic of the kind shown at B of FIG. 4. It should be noted that in order to simplify the structure, the phase/amplitude estimation unit 20 is capable of being implemented by performing moving average processing separately for the real/imaginary parts.

In accordance with the above embodiment, the information components of the DPCCH control channel and DPDCH data channel are decided using the estimated values of phase/amplitude that are output from the phase/amplitude estimation unit 20, these information components are removed from the receive signals of the data bit sequences that are influenced by the propagation path characteristics of the DPCCH control channel and DPDCH data channel, and data sequences indicative of the phase characteristic and amplitude characteristic that the control channel and data channel have received over the propagation path are generated artificially and delivered as outputs. As a result, a highly precise data sequence of propagation path characteristics can be generated by adding the data sequence of the propagation path characteristics of the DPCCH control channel and the data sequence of the propagation path characteristics of the DPDCH data channel, and highly precise estimated values of propagation path characteristics can be obtained by passing this data sequence through a FIR filter and moving average processing circuit.

Modification

The above embodiment deals with a case where the information decision units 12, 16 decide (hard decision) a sign bit of each information component on the DPCCH control channel and DPDCH data channel. However, it can be so arranged that a complex operational result is output as is. Specifically, the information decision unit 12 performs complex multiplication between a complex-represented receive signal and a complex conjugate of the phase/amplitude information, and outputs the obtained results of the complex multiplication to the information selector 13 as decision information. If the information-type selection signal indicates that the output of the information decision unit 12 is a known information bit, the information selector 13 converts the known information that enters from the known-information input terminal 05 to maximum likelihood and outputs the same. On the other hand, if the information-type selection signal indicates that the output of the information decision unit 12 is an information bit other than a known information bit, then the information selector 13 outputs the result of multiplication (a complex value) that enters from the information decision unit 12.

The multiplier 14 multiplies the information component selected by the information selector 13 by the data bit sequence of the DPCCH control channel, which has been influenced by propagation path characteristics, output from the DPCCH correlator 11, and removes the information component from this data bit sequence. The multiplier 14 performs the operation indicated by the following equation:

$$(DI+jDQ) \times (II-jIQ) \qquad (7)$$

where II+jIQ represents the information component selected by the information selector 13 and DI+jDQ represents the data bit sequence of the DPCCH control channel. On the DPDCH data channel side also, in a manner similar to that of the DPCCH control channel described above, the information decision unit 16 outputs the results of complex multiplication as decision information, and the multiplier 17 multiplies the data bit sequence of the DPDCH data channel, which has been influenced by the propagation path characteristics, output from the DPDCH correlator 15 by the results of the complex multiplication and removes the information component from this data bit sequence. The estimated values of phase/amplitude are subsequently output via the adder 19 and phase/amplitude estimation unit 20.

In accordance with this modification, likelihood information is appended to the information components of the data bit sequences that are output from the information decision units, 12, 16. As a result, even if power diminishes owing to fading, the influence upon the phase/amplitude estimation operation performed by the phase/amplitude estimation unit 20 can be mitigated.

(C) Alternative Arrangement of Information Decision Unit

In each finger of a multipath scheme, the phase/amplitude characteristics on each propagation path are estimated in a manner similar to that shown in FIG. 1. Therefore, if it is so arranged that results (complex information) of decisions by information decision units of respective fingers are combined and the sign bits of information components are decided based upon the combined results, a diversity effect can be obtained to improve the precision of the decisions.

Figure 5:
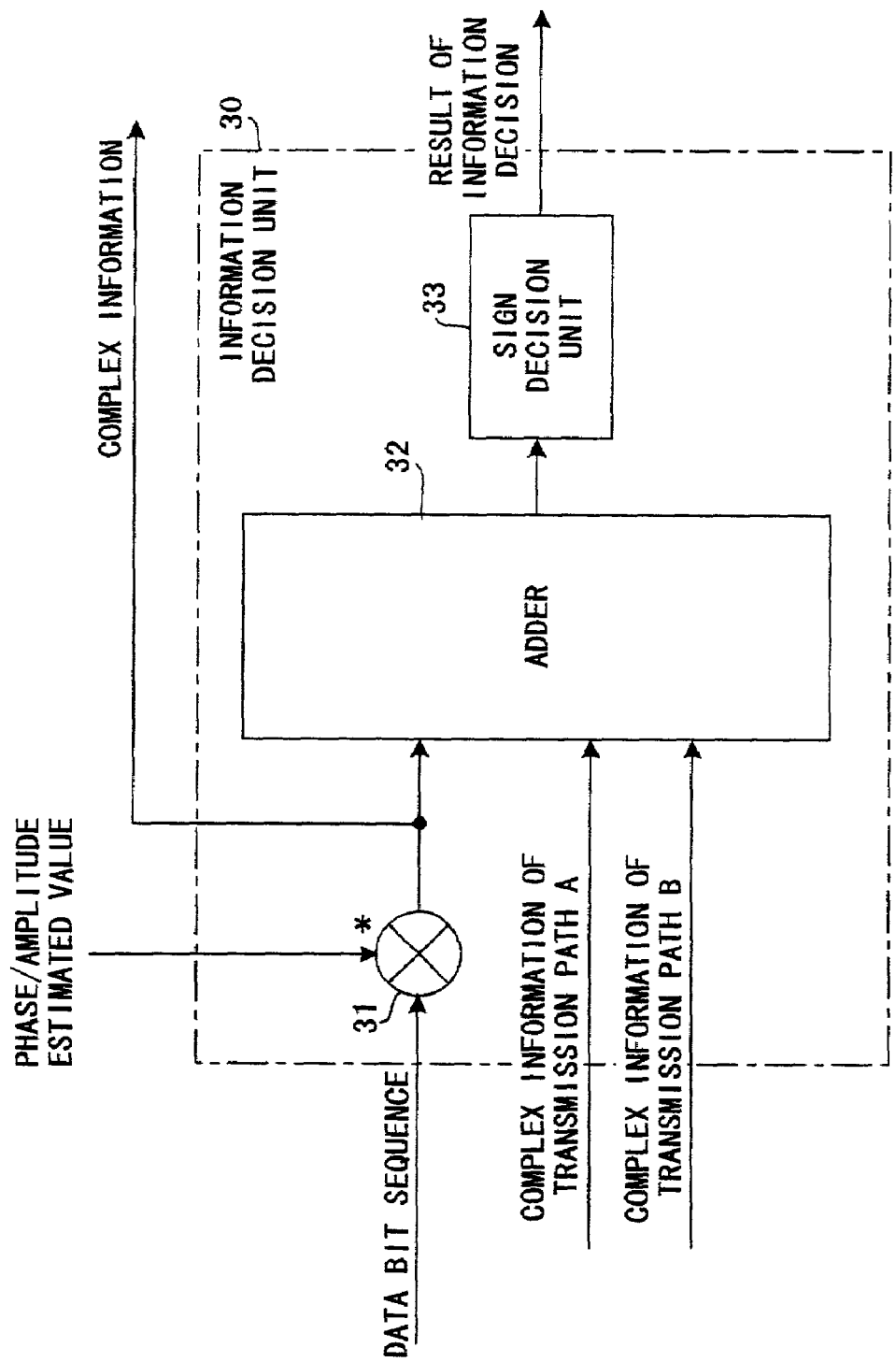
FIG. 5 is a block diagram of another information decision unit.

FIG. 5 is a block diagram of an information decision unit 30 in such case. The information decision unit 30 can be used instead of the information decision units 12 and 16 of FIG. 1. The information decision unit 30 has a multiplier 31, an adder 32 and a sign decision unit 33. A data bit sequence output from the correlator 11 or 15 and a complex conjugate of the estimated value of phase/amplitude output from the phase/amplitude estimation unit 20 (see FIG. 1) enter the multiplier 31. The latter multiplies these input signals and outputs, as a complex number, the information component of the data bit sequence on the DPCCH control channel or DPDCH data channel. The multiplier 31 outputs the product to information decision units 30 on other paths (propagation paths A and B), which constitute the multiple paths.

The adder 32 adds the complex information output from the multiplier 31 and complex information that enters from the information decision units 30 of the other paths (propagation paths A and B) and inputs the sum to the sign decision unit 33. The latter decides the sign of the data bits based upon the sum from the adder 32 and outputs the sign.

In accordance with this embodiment, a diversity effect is obtained by adding complex information that is output from the information decision units of respective ones of the paths of multiple paths, and it is possible to raise significantly the precision with which the code decision unit decides the codes of the information components.

(D) Alternative Structure of Phase/Amplitude Estimation Unit

The precision of the information of the phase/amplitude characteristic in the data bit sequence output by the adder 19 is good when power is high but declines when power is low. Accordingly, the output data from the adder 19 is adopted as is when the power is high. When power is low, the output data from the adder 19 is estimated using the data that prevailed one symbol earlier, and the estimated data is delivered as the output.

Figure 6:
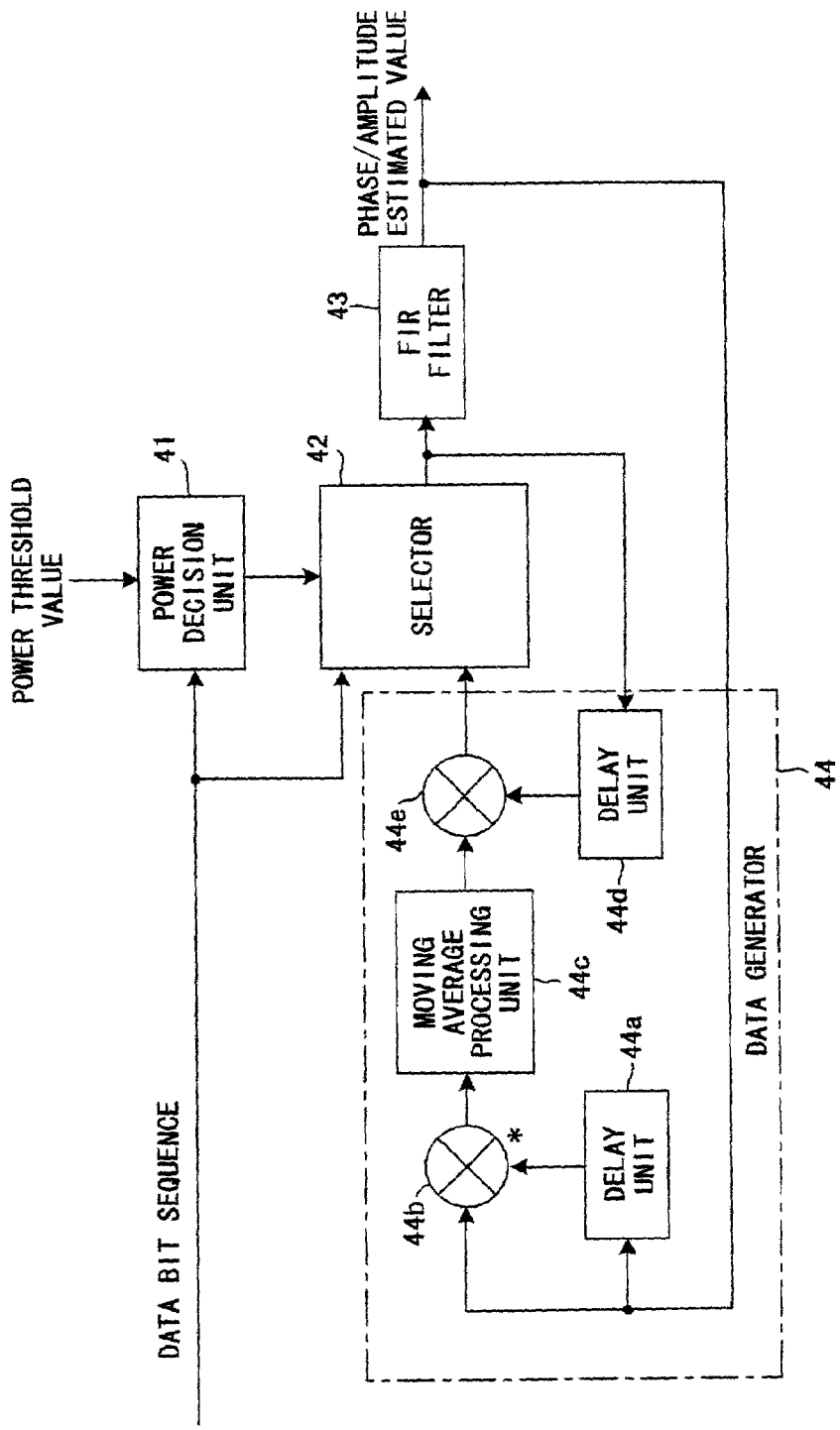
FIG. 6 is a block diagram of another phase/amplitude estimation unit.

FIG. 6 is a block diagram of a phase/amplitude estimation unit that implements such control. This phase/amplitude estimation unit has a power decision unit 41 the inputs to which are the data bit sequence (data symbols) output from the adder 19 and a power threshold value; a selector 42 which, based upon the magnitude of the power, selectively outputs the data symbols from the adder 19 or the data that prevailed on symbol earlier; a FIR filter 43; and a data generator 44 for generating the current data symbols using the data that prevails one symbol earlier.

The data generator 44 has a delay unit 44a for delaying the estimated value of phase/amplitude by one symbol; a multiplier 44b for multiplying the estimated value of phase/amplitude in the present sample by the complex conjugate of the estimated value of phase/amplitude one symbol earlier, thereby calculating the phase variation over the duration of one symbol; a moving average processing unit 44c for calculating and outputting the moving average of phase variation over the duration of one symbol; a delay unit 44d for delaying the selector output by one symbol; and a multiplier 44e for multiplying the phase variation over one symbol, which phase variation is the output of the moving average processing unit 44c, by the selector output, which prevailed one symbol earlier, output by the delay unit 44d, thereby estimating the present output of the adder 19.

The power decision unit 41 compares the value of power of data bits that enter from the adder 19 with the power threshold value, outputs a low-level signal ("0") as the select information if the value of power of the entered data bits is less than the threshold value, and outputs a high-level signal ("1") as the select information if the value of power of the entered data bits is greater than the threshold value.

Meanwhile, the multiplier 44b multiplies, symbol by symbol, the information of the phase/amplitude estimated value output from the FIR filter 43 by the complex conjugate of the value that prevailed one symbol earlier, thereby finding the amount of phase variation symbol by symbol. The moving average processing unit 44c obtains the average amount of phase variation by averaging the amount of phase variation over a predetermined interval. The phase/amplitude characteristic data one symbol earlier output by the selector 42 is phase-shifted by the multiplier 44e by the amount of the average phase variation obtained by the moving average processing unit 44c, and the value obtained by the phase shift is input to the selector 42.

If the value of the select information that enters from the power decision unit 41 is "1", the selector 42 selects the bit data that enters from the adder 19. If the value of the select information is "0", the selector 42 selects the value that was obtained by phase-shifting, by the average amount of phase variation, the phase of the data bits output one sample earlier. The selected data is input to the FIR filter 43. The latter outputs the estimated value of amplitude/phase by executing filtering processing using the data bit sequence that has been selected.

In accordance with the embodiment of FIG. 6, it is so arranged that if the power of data symbols that enter the phase/amplitude estimation unit is low, a value that is input to a FIR filter is obtained by phase-shifting, by the average amount of phase variation, the phase of the data symbols output one sample earlier. As a result, even if the power of data symbols is low, it is possible to obtain an estimated value of phase/amplitude having a high precision. Further, it is so arranged that the amount of phase variation is estimated using the estimated value of phase/amplitude output from the FIR filter.

Figure 4:
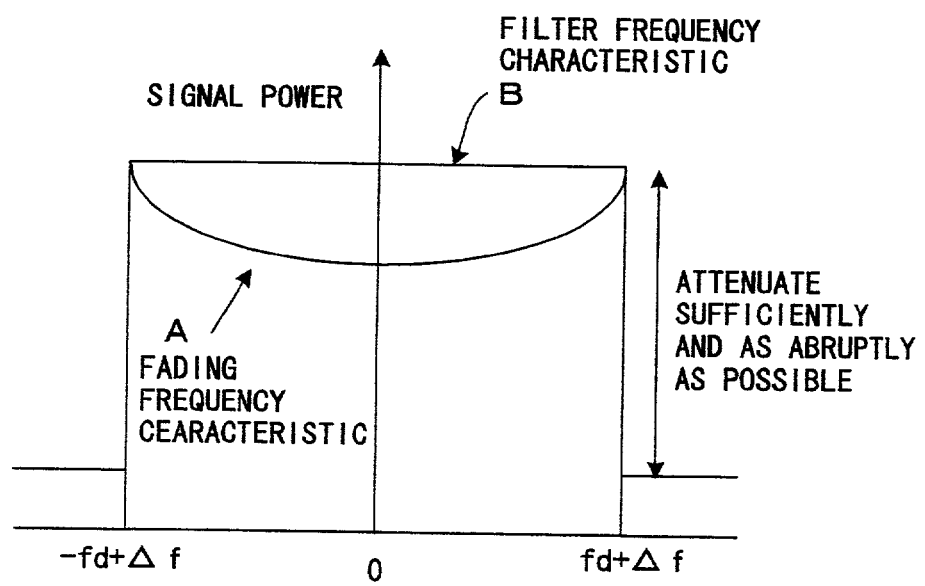
FIG. 4 is a diagram illustrating a fading frequency characteristic and a filter frequency characteristic.

(E) Measures for when Fixed Amount of Variation in Phase Between Symbols Output by Correlator is Large As described in connection with FIG. 4, a baseband signal following quasi-synchronous detection by a receiver includes a Doppler frequency shift that is caused by movement of the mobile station and frequency variation that is caused by carrier frequency error between the mobile station and the receiver. Generally, the Doppler frequency shift is a parameter that is constantly fluctuating, whereas a variation $\Delta f$ in the carrier frequency error is a fixed parameter that does not vary over a long interval of time and may be considerably larger than the Doppler frequency shift. If $\Delta f$ can be estimated by some method in such cases, it will suffice to form a filter that band-passes –fd to fd. The filter may be formed very easily even if $\Delta f$ becomes large relative to fd. Accordingly, means are provided for detecting a phase variation amount $\phi$ per symbol that is caused by the variation $\Delta f$ in the carrier frequency error, and an improvement is applied to part of the phase/amplitude estimation circuit shown in FIG. 1.

(a) Improvement Relating to Information Decision Unit

Figure 7:
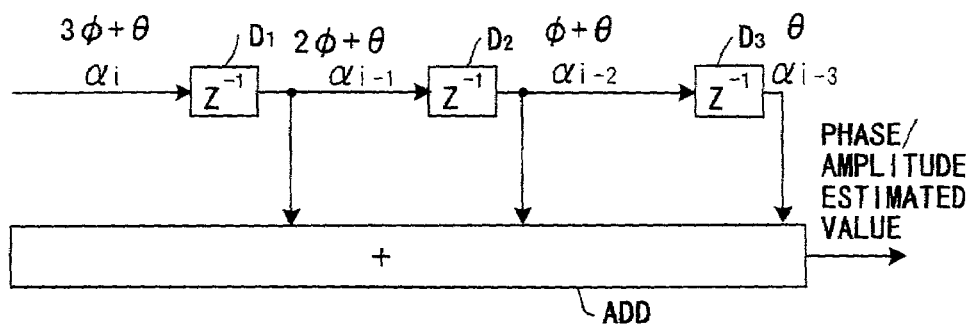
FIG. 7 is a block diagram of a moving average processing circuit having three taps.

Let $\phi$ represent the phase variation amount per symbol that is caused by the variation $\Delta f$ in the carrier frequency error, let $\theta$ represent the phase variation amount per symbol that is caused by the Doppler frequency shift, and assume that $\phi>>\theta$ holds. If the phase of a symbol $\alpha_i$ output from the correlator 15 (FIG. 1) at a certain time is $3\phi+\theta$, then the phases of symbols one, two and three symbols earlier can be expressed as follows: $\alpha_{i-1}=2\phi+\theta$, $\alpha_{i-2}=\phi+\theta$, $\alpha_{i-3}=\theta$, respectively, from $\phi>>\theta$. If the phase/amplitude estimation unit 20 is constituted by the 3-tap moving average processing circuit shown in FIG. 7, the phase/amplitude estimation unit 20 outputs the estimated value of phase/amplitude having the phase information of symbol $\alpha_{i-2}$ of the center tap based upon the phase relationship of moving average processing.

Figure 8:
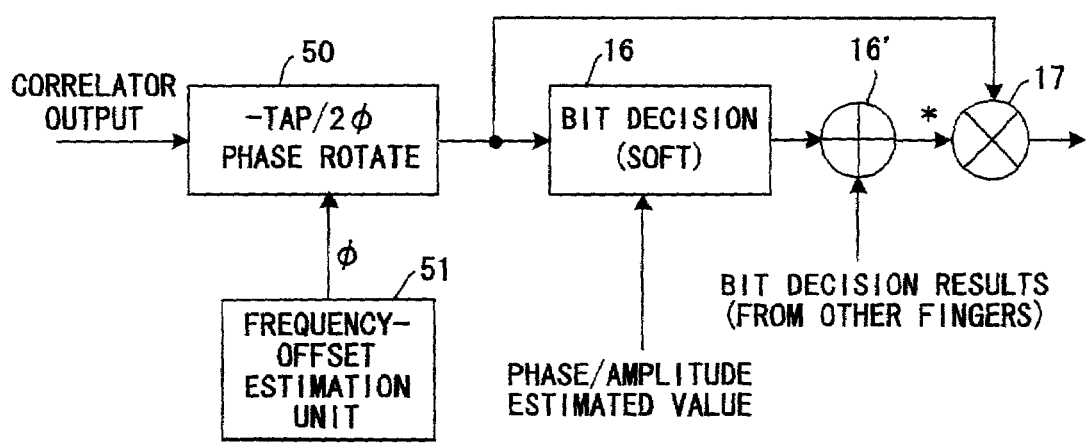
FIG. 8 is a block diagram illustrating units peripheral to the information decision unit in a case where a fixed amount of variation in phase ascribable to a frequency offset is large.

As a result of the foregoing, the phase ($=3\phi+\theta$) of the symbol $\alpha_i$ that enters the information decision unit 16 from the correlator 15 leads the phase ($=\phi+\theta$) of the estimated value of phase/amplitude by $2\phi$; if $\phi$ is large, a correct information decision can no longer be made. According to the present invention, therefore, a phase rotating unit 50 is provided in front of the information decision unit (Bit Decision) 16, as shown in FIG. 8, and control is carried out in such a manner that the phase of the symbol $\alpha_i$ that enters from the correlator 15 is rotated by $2\phi$ to match the phase of the estimated value of phase/amplitude. More specifically, the phase rotating unit 50 calculates a phase rotation amount $\beta$ in accordance with the following equation:

$$\beta = -[(TAP-1)/2+1] \times \phi$$

using the amount $\phi$ of phase variation ascribable to a frequency offset that enters from a frequency-offset estimation unit 51. Here $\beta = -2\phi$ holds because TAP=3 holds. Next, the phase rotating unit 50 executes processing for advancing the phase of symbol $\alpha_i$ by $\beta$ (for pulling back phase by $2\phi$) to match the phase with that of the estimated value of phase/amplitude. As a result of this operation, the information decision precision of the information decision unit 16 is improved.

Figure 9:
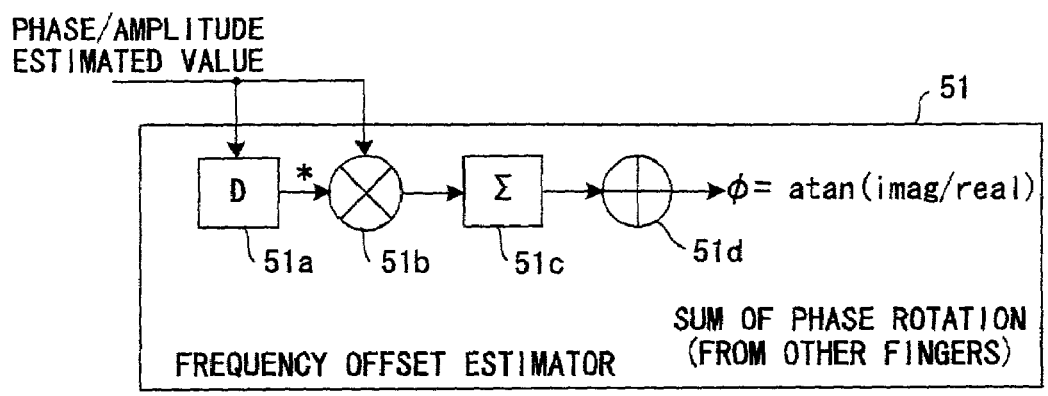
FIG. 9 is a block diagram illustrating a frequency offset estimation unit.

The frequency-offset estimation unit 51 has the structure shown in FIG. 9. In accordance with FIG. 4, the Doppler frequency shift has a distribution that takes on left-right symmetry centered on 0 Hz from −fd to fd. Accordingly, by averaging the receive signal over a long interval, the Doppler frequency shift is cancelled out and it is possible to detect the phase variation amount $\phi$ per symbol that is caused by the frequency offset $\Delta f$. In the frequency-offset estimation unit 51, therefore, a delay unit 51$a$ delays the estimated value of phase/amplitude by the duration of one sample, a multiplier 51$b$ multiplies the estimated value of phase/amplitude in the present sample by the complex conjugate of the estimated value of phase/amplitude that prevailed one sample earlier, thereby calculating the phase variation over one sample, and an averaging processor 51$c$ calculates the average value of phase variation over one sample output from the multiplier 1$b$ and outputs an amount of phase variation per symbol that is caused by the frequency offset $\Delta f$. An adder 51$d$ adds this amount of phase variation and the amounts of phase variation that enter from other fingers, thereby raising the detection precision by the diversity effect, and outputs the phase variation amount $\phi$ per symbol that accompanies the frequency offset $\Delta f$. In actuality, a complex operation is performed by each arithmetic unit and the phase variation amount $\phi$ is calculated in accordance with the following equation:

$$\phi = \tan^{-1}(\text{imag}/\text{real})$$

using the real part "real" and imaginary part "imag" of the complex number output from the adder 51$d$.

The reason for adopting the estimated value of phase/amplitude as the signal applied to the frequency-offset estimation unit 51 is that the signal obtained by removing interference from the receive signal is the estimated value of phase/amplitude and therefore inputting this signal results in better characteristics than would be obtained by inputting the receive signal directly.

Thus, in FIG. 8, the phase rotating unit 50 rotates the phase of the data bit sequence on the DPDCH data channel output from the correlator 15 by $\beta$ (=$2\phi$), and the information decision unit 16 multiplies the information component of the phase-rotated data bit sequence by the complex conjugate of the estimated value of phase/amplitude and outputs the result of complex multiplication. An adder 16' adds the result of complex multiplication and the results of complex multiplication from the other fingers, thereby raising the detection precision by the diversity effect. A multiplier 17 multiplies the complex conjugate of the output of adder 16' by the output of the correlator and outputs information indicating the phase and amplitude characteristics of the propagation path.

Though a case in which there are three taps is described above, any number of taps may be used. Further, a case in which the phase rotating unit 50 is provided in front of the information decision unit 16 is described above. However, it is also possible to provide a phase rotating unit in front of the information decision unit 12.

(b) Improvement in Phase/Amplitude Estimation Unit

Figure 10:
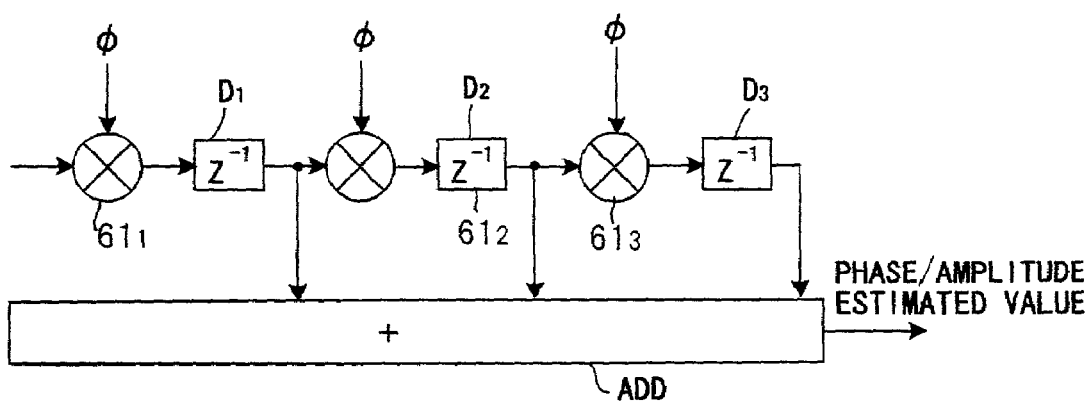
FIG. 10 is a block diagram of a moving average processing circuit that constructs a phase/amplitude estimation unit in a case where a fixed amount of variation in phase based upon a frequency offset is large.

If the phase/amplitude estimation unit 20 is constituted by, e.g., a 3-tap moving average processing circuit or a FIR filter, the phases of the symbols $\alpha_i$ to $\alpha_{i-3}$ at each of the taps will be $3\phi+\theta$, $2\phi+\theta$, $\phi+\theta$, $\theta$, the phases differ by a wide margin and an accurate estimated value of phase/amplitude can no longer be output. It is necessary, therefore, that the phases at the taps be made to coincide. In the present invention, the phases at the taps are made to coincide by providing phase rotation units 61$_1$ to 61$_3$, which are for rotating phase by $\phi$, in front of the delay units $D_1$ to $D_3$, as shown in FIG. 10. More specifically, if the phase of the input data to the phase/amplitude estimation unit 20 is $3\phi+\theta$, then the phase of the data one symbol earlier will be $2\phi+\theta$. However, because the phase rotating unit 61$_1$ rotates the phase by $\phi$, the phase becomes $(2\phi+\theta)+\phi=3\phi+\theta$ in total. Similarly, the phase of data two symbols earlier is $\phi+\theta$. However, because the phase rotating units 61$_1$, 61$_2$ each rotate phase by $\phi$, the phase becomes $(\phi+\theta)+2\phi=3\phi+\theta$ in total. The phase of data three symbols earlier is $\theta$. However, because the phase rotating units 61$_1$, 61$_2$, 61$_3$ each rotate phase by $\phi$, the phase becomes $\theta+3\phi$ in total. Thus the phases at the taps are made to coincide. Though a case in which there are three taps is described above, any number of taps may be used.

Figure 11:
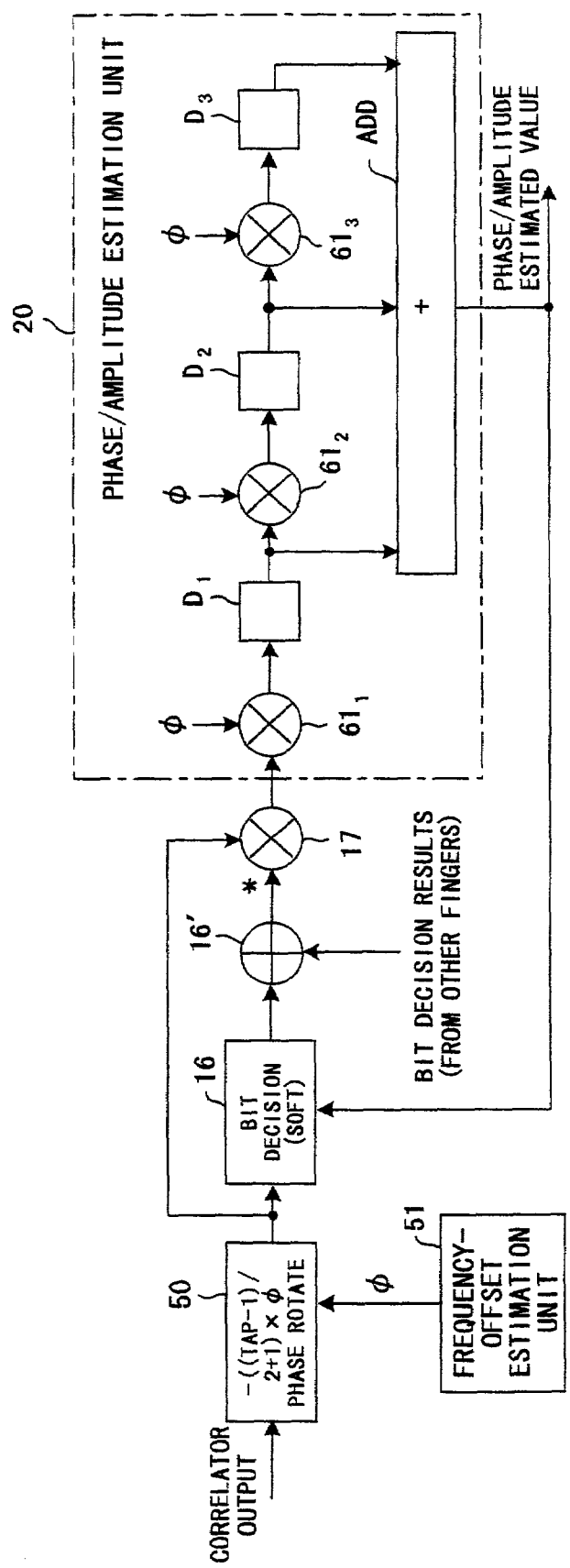
FIG. 11 is a block diagram obtained by connecting the moving average processing circuits of FIGS. 8 and 10.
Figure 12:
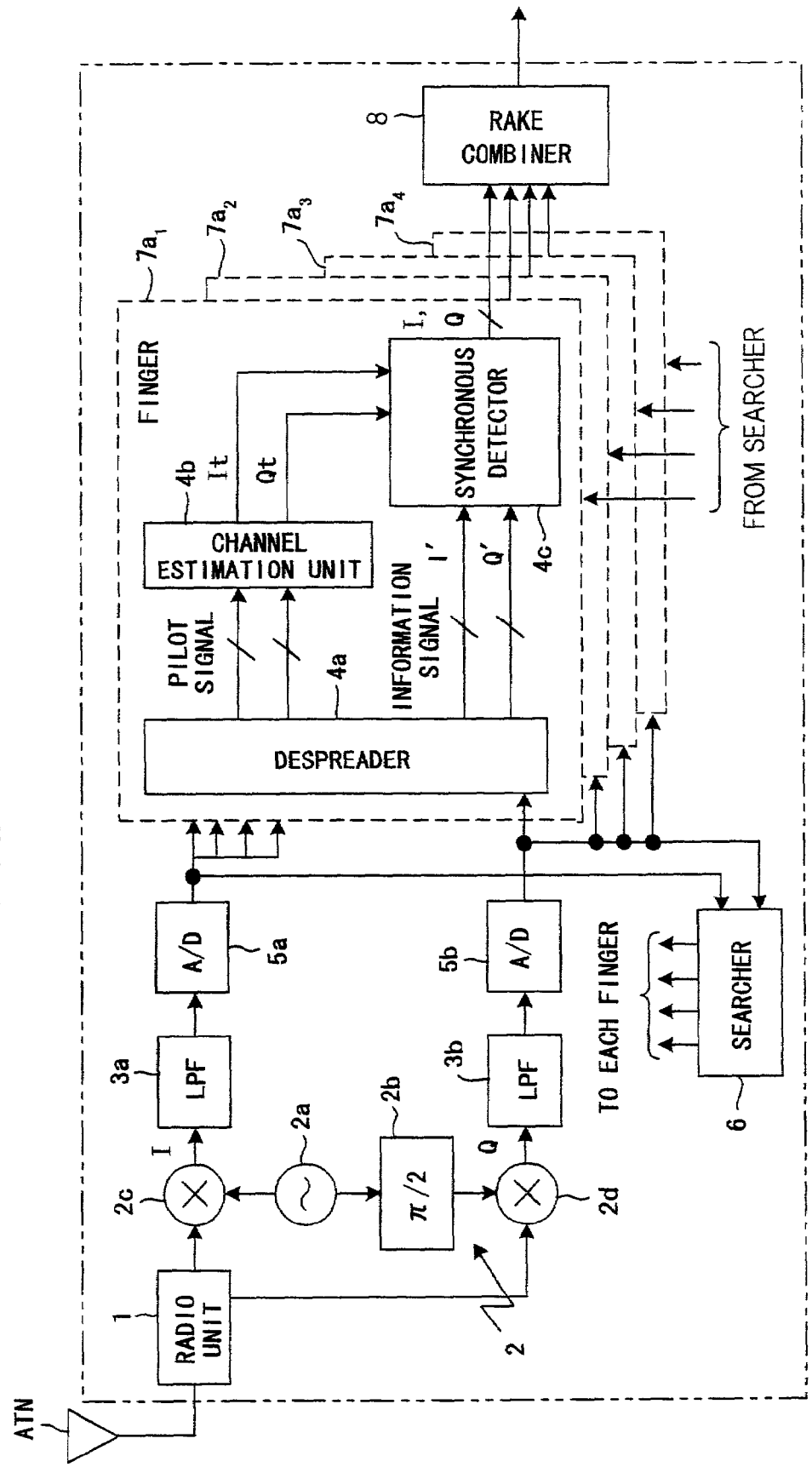
FIG. 12 is a block diagram of a CDMA receiver according to the prior art.
Figure 13:
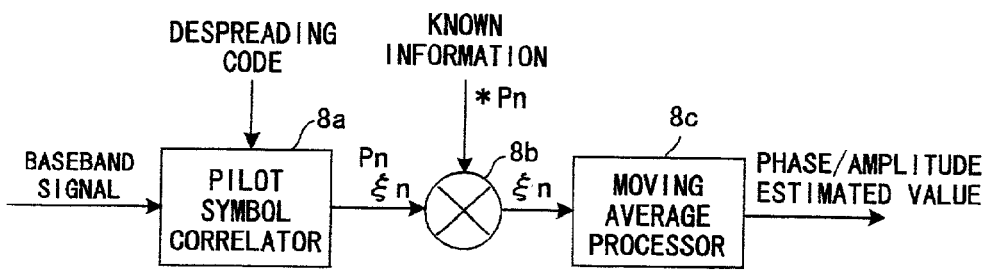
FIG. 13 is a block diagram of an apparatus for estimating phase/amplitude characteristics in a frame format according to the prior art.

FIG. 11 illustrates an embodiment in which the phase/amplitude estimation unit 20 of FIG. 10 is connected in series with the arrangement of FIG. 8. Adopting this structure makes it possible to remove the phase variation amount $\phi$ per symbol that is caused by $\Delta f$. By removing the phase variation amount $\phi$, it becomes very easy to form a filter, as mentioned earlier. Specifically, it becomes possible to increase the number of shift-register stages so that a filter having a steep, large attenuation can be formed.

(F) Modification (1) In the foregoing embodiment, use is made of a FIR filter as means for removing frequency components above a frequency allowed by the system, but equivalent effects can be expected even with a filter of a form other than that of an FIR filter, such as an IIR filter. However, it would be necessary to select a filter in which the phase rotation by the filter is as small as possible.

(2) In the foregoing embodiment, use is made of a FIR filter as means for removing frequency components above a frequency allowed by the system, but equivalent effects can be expected even if zero is substituted for the values of frequency components allowed by the system, after a discrete Fourier transform has been applied, and then an inverse discrete Fourier transform is applied.

(3) In the foregoing embodiment, use is made of a FIR filter as means for removing frequency components above a frequency allowed by the system, but equivalent effects can be expected even if use is made of a noise reducing technique based upon wavelet degeneracy.

(4) In the foregoing embodiment, use is made of a FIR filter as means for removing frequency components above a frequency allowed by the system, but equivalent effects can be expected even if an approximation is performed by the least square method.

(5) In the embodiment of FIG. 6, multiplication is applied using the complex conjugate of the value that prevailed one symbol earlier and then moving average processing is executed to obtain the amount of variation in phase. However, equivalent effects can be expected by using an estimation technique such as CORDIC.

In accordance with the present invention, it is so arranged that information components of a DPCCH control channel and DPDCH data channel are decided using estimated values of phase/amplitude, which are output from a phase/amplitude estimation unit, as a phase reference, these information components by the above decision are removed from the data bit sequences that are influenced by the propagation path characteristics of the DPCCH control channel and DPDCH data channel, and data sequences indicative of the phase characteristic and amplitude characteristic that the control channel and data channel have suffered on the propagation path are generated artificially and delivered as outputs. As a result, a highly precise data sequence of propagation path characteristics can be generated by adding the data sequence of the propagation path characteristics of the DPCCH control channel and the data sequence of the propagation path characteristics of the DPDCH data channel. Moreover, highly precise estimated values of propagation path characteristics can be obtained by passing this data sequence through a FIR filter and moving average processing circuit.

Further, in accordance with the present invention, it is so arranged that an information decision unit performs complex multiplication between a complex-represented receive signal and a complex conjugate of phase/amplitude information, and outputs the obtained results of the complex multiplication to the information selector 13 as decision information. Likelihood information therefore can be appended to the output signal of the information decision unit. As a result, even if power of the data bit sequence diminishes owing to fading or the like, the influence upon the phase/amplitude estimation operation performed by the phase/amplitude estimation unit can be mitigated.

Further, in accordance with the present invention, a diversity effect is obtained by adding complex information output by the information decision units of respective ones of the paths of multiple paths. It is possible, therefore, to raise significantly the precision with which the sign decision unit decides the sign bits of the information components.

Further, in accordance with the present invention, it is so arranged that if the power of data symbols that enter the phase/amplitude estimation unit is low, a value that is input to a moving average processing circuit or FIR filter, etc., is obtained by phase-shifting, by the average amount of phase variation, the phase of the data symbols output one sample earlier. As a result, even if the power of data symbols is low, it is possible to obtain an estimated value of phase/amplitude having a high precision.

Further, in accordance with the present invention, it is so arranged that even if a fixed amount of variation in phase based upon a frequency offset is large, the phase of symbols output from a correlator is rotated to match the phase with that of the estimated value of phase/amplitude. As a result, the precision with which the information decision unit decides information components can be improved and it is possible to improve the precision with which the phase/amplitude characteristics of the propagation path are estimated.

Further, in accordance with the present invention, even if a fixed amount of variation in phase based upon a frequency offset is large, phase-rotation control is performed so as to match the phases of symbols at respective ones of the taps of a FIR filter or moving average processing circuit that constructs a phase/amplitude estimation unit. As a result, it is possible to improve the precision with which the phase/amplitude characteristics of the propagation path are estimated.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for estimating propagation path characteristics in a communication system in which information is transmitted upon being code-multiplexed onto a data channel on which known information is transmitted upon being time-multiplexed between items of unknown information and a data channel on which only unknown information is transmitted, said apparatus comprising:
    a first transmit information removal unit for removing, from a receive signal on a data channel on which known information is transmitted upon being time-multiplexed between items of unknown information, transmit information on this channel;
    a second transmit information removal unit for removing, from a receive signal on a data channel on which only unknown information is transmitted, transmit information on this channel;
    an adder for adding outputs from said first and second transmit information removal units; and
    a phase/amplitude estimation unit for estimating, from an output of said adder, a phase characteristic and an amplitude characteristic that each channel has suffered over a propagation path.

2. The apparatus according to claim 1, wherein said first transmit information removal unit includes:
    an information decision unit for deciding transmit information from the receive signal based upon phase/amplitude information indicative of the propagation-path phase/amplitude characteristics output from said phase/amplitude estimation unit;
    an information selection unit for outputting known information, which enters from a known-information generator, if the transmit information is known information, and decision information, which enters from said information decision unit, if the transmit information is unknown information; and
    a multiplier for performing multiplication so as to remove an information component, which has been output by said information selection unit, from the receive signal that has been input to said information decision unit.

3. The apparatus according to claim 1, wherein said second transmit information removal unit includes:
    an information decision unit for deciding transmit information from the receive signal based upon phase/amplitude information indicative of the propagation-path phase/amplitude characteristics output from said phase/amplitude estimation unit; and
    a multiplier for performing multiplication so as to remove an information component, which has been output by said information decision unit, from the receive signal that has been input to said information decision unit.

4. The apparatus according to claim 3, wherein said second transmit information removal unit further includes a power-value compensator unit for matching power units of the data channels.

5. The apparatus according to claim 2, wherein said information decision unit performs complex multiplication between the receive signal, which is expressed by complex representation, and a complex conjugate of the phase/amplitude information, and decides sign bits of the transmit information based upon results of the multiplication.

6. The apparatus according to claim 2, wherein said information decision unit performs complex multiplication between the receive signal, which is expressed by complex representation, and a complex conjugate of the phase/amplitude information, and outputs, as the decision information, results obtained by performing the complex multiplication.

7. The apparatus according to claim 2, wherein said information decision unit performs complex multiplication between the receive signal, which is expressed by complex representation, and a complex conjugate of the phase/amplitude information, outputs results of the complex multiplication, adds the result of the complex multiplication and results of the complex multiplication output by other apparatus of different propagation path with regard to the same data channel, and decides sign bits of the transmit information based upon results of addition.

8. The apparatus according to claim 1, wherein said phase/amplitude estimation unit includes:
a power comparator for comparing a power value of a data symbol that enters from said adder with a set power value;
a phase variation amount monitoring unit for calculating an average value of amount of phase variation symbol by symbol on the propagation path;
a selection unit for selecting the data symbol if the power value of an input data symbol is greater than the set power value, and, if the power value of the input data symbol is less than the set power value, selecting a symbol obtained by phase-rotating, by an amount equivalent to the average value of amount of phase variation, a phase component of a data symbol that was selected immediately prior to said input data symbol; and
means to which the symbol selected by said selection unit is input for outputting phase/amplitude information indicative of the phase/amplitude characteristics of the propagation path.

9. The apparatus according to claim 1, further comprising:
a fixed phase variation detector for detecting a fixed phase variation $\Phi$ that is caused by a frequency variation between oscillation frequencies in a transmitter and receiver; and
a phase rotator which, if said phase/amplitude estimation unit is constituted by a filter having a plurality of taps, is for rotating the phase of the receive signal by $M \cdot \Phi$ as to match the phases of data with data at an Mth center tap.

10. The apparatus according to claim 9, wherein a phase rotator for rotating phase by an amount equivalent to the fixed phase variation $\Phi$ is provided between taps of said filter.

* * * * *